Feb. 5, 1935.    C. A. JACQUES    1,989,930
MEANS FOR TERMINATING MULTICONDUCTOR HIGH VOLTAGE CABLES
Filed Nov. 5, 1931
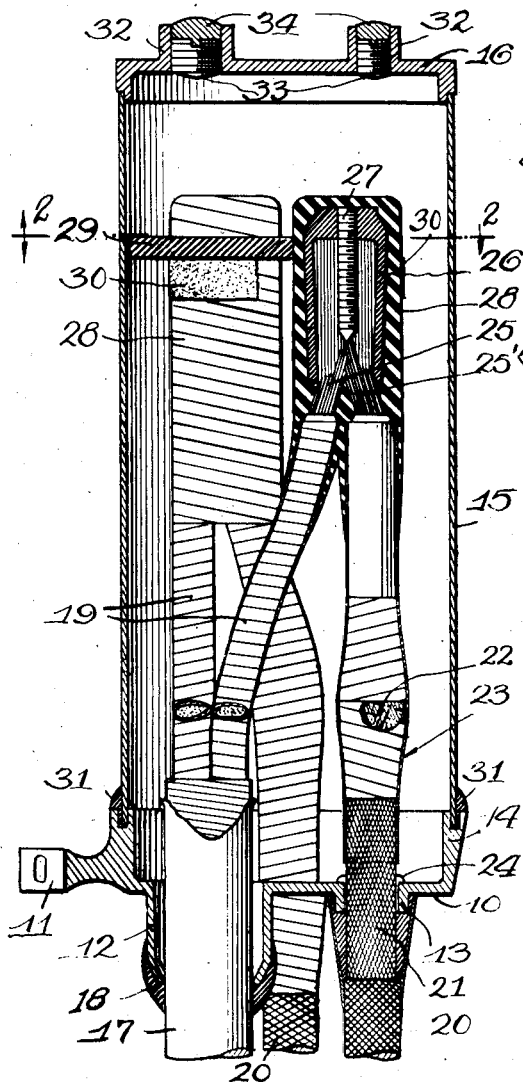
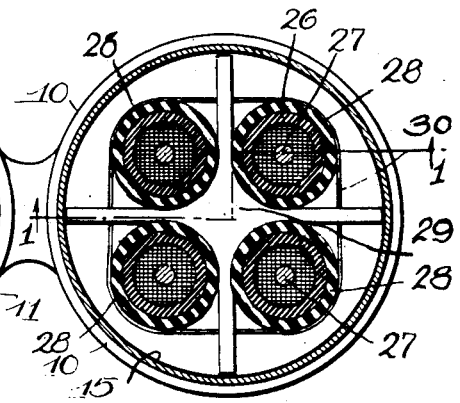
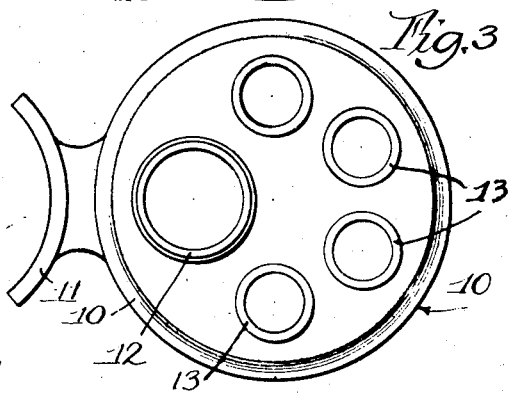
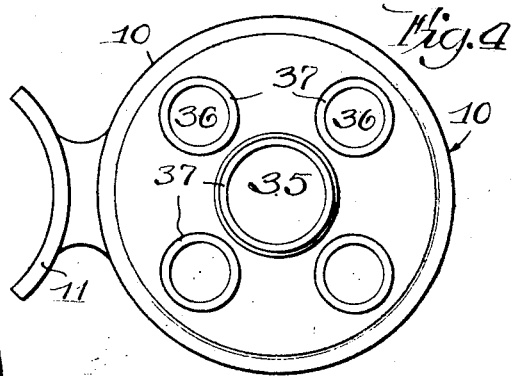
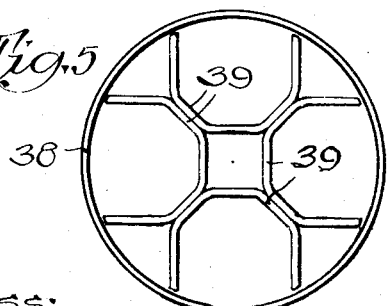

Patented Feb. 5, 1935

1,989,930

UNITED STATES PATENT OFFICE 1,989,930

MEANS FOR TERMINATING MULTICON-
DUCTOR HIGH VOLTAGE CABLES

Cloyce A. Jaques, Chicago, Ill.

Application November 5, 1931, Serial No. 573,122

5 Claims. (Cl. 247—6)

My invention relates to improvements in means for terminating multi-conductor, high voltage cables, particularly those containing paper insulation.

Overhead connections made heretofore from high voltage, insulated cables to the smaller cables or wires representing the several phases of a multiphase circuit have involved the use of a pothead; i. e., a metal casing with a removable cover and having porcelain bushings or petticoats and a gasket of considerable extent between the casing and its cover, to maintain a tight joint, as it is essential that water be prevented from reaching the insulation.

The objection to potheads is that they are expensive. Furthermore, it is difficult to maintain a tight joint around an opening having an extended periphery and even a small leak in connection with the expansion and contraction of the parts, results in a condition whereby moisture is drawn into the casing and affects the insulating properties of the covering on the conductors. Also, since the conductors from the pothead to the line wires are insulated from the pot-head and not grounded, there is serious danger of accident to a workman on the pole, should he come in contact with one of said conductors at a point where the insulation has been damaged.

The main object of my invention is to overcome these difficulties and to provide a generally improved construction.

Contributory objects are, to provide a terminal joint structure by which cables of a certain type are grounded, thereby dispensing with the necessity for expensive porcelain bushings and greatly reducing the hazard to workmen; to provide a structure having a base through which all of the cables pass and a removable casing or enclosure above said base whereby the cable ends are readily accessible; to provide a structure of this character in which no gasket is required and in which contraction and expansion of the parts will not result in drawing moisture into the casing.

In the accompanying drawing wherein one embodiment of my invention is illustrated, Fig. 1 is a central vertical section of the structure on the line 1—1 of Fig. 2;

Fig. 2 is a section on the line 2—2 of Fig. 1;

Fig. 3 is a bottom view with the cables removed;

Fig. 4 is a bottom view of a modified form of device;

Fig. 5 is a top view of a spacer.

The structure, in the form selected for illustration, consists of a base 10, preferably in the form of a casting of circular outline with a bracket 11 at one side thereof to permit attachment to a pole or other structure. The casting has a number of openings therein, the large opening being surrounded by a depending flange 12 and the smaller openings, of which there are four in this case, each being surrounded by a flange 13. The casting has a flange 14 at the periphery with a recess therein to receive the bottom of a cylindrical housing 15 having a top 16.

The lead sheathed cable 17 passes through the base, a wiped joint 18 uniting the cable sheath to the flange 12, thereby grounding the structure. Within the housing the lead sheath and the belt insulation are removed as shown, whereby said lead sheath projects only a short distance above the base 10 and the belt insulation a short distance above the end of said sheath. In some types of cable, the belt insulation is made of paper, which material absorbs moisture readily. This property is inherent also in various other kinds of insulation used in cables, although to a lesser extent. Above the belt insulation, the conductors are shown as diverging from each other, being wrapped during installation with the usual varnished cambric or tape, beneath which is the original insulation, which may be paper or other material. In making the installation it will be understood that the housing 15 is not assembled on the base 10 until all the connections have been made. In other words, the upper end of the cable is exposed to view and in a position conveniently accessible to the workman. The individual conductors 19, of which there may be two, three or four, (each consisting of a multiplicity of copper wires), represent the several phases of a multi-phase, high voltage line, which, in practice, may vary from about 2,000 volts to 30,000 volts. Instead of taping said conductors with cambric or other suitable tape, as shown in Fig. 1, they may be protected by fibre insulators as hereinafter described.

The smaller cables or so-called single conductor cables 20, of which there are four in this instance, enter the base through the smaller openings referred to. These smaller cables, in this instance, have an outer, braided weatherproofed covering of non-metallic material under which is a flexible metallic reinforcement. As shown in Fig. 1, the outer covering is removed from that portion of the cable within the housing, exposing said metallic reinforcement 21 which in this case is braided. Where the metal braid terminates, additional insulation is wrapped around the cable for a few inches and over this, additional metal braid is wrapped, preferably copper braid, as shown at 22, after which said braid is covered with tape 23 to within a short distance of the base 10. The remaining exposed metal braid 21 just above the base 10 is soldered to said base, in each case, at 24, thereby grounding all of said cables.

The upper ends of the cables have their insulation removed for several inches, thereby exposing the copper conductors 25, 25', which are held together by means of a clamp consisting, in the form illustrated, of a tapering metal sleeve 26 with a screw 27 passing therethrough which spreads the conductors and establishes good electrical contact, after which the upper part of said screw may be cut off as shown. Said screw clamp is then covered with tape 28 as shown in Fig. 1, the finished appearance being that of the left hand connection shown in said figure, the right hand connection being shown in section. Other types of connectors soldered or solderless may be used.

The four connectors thus formed are separated by a fibre spacer 29, as shown in Fig. 2, beneath which is wrapped additional tape 30 to hold it in position.

After the connections have been made in the manner described, the casing 15 is mounted on the base flange 14 and held in place by a wiped joint 31.

A suitable compound is then poured in through the openings formed by the bosses 32 on the cover 16, said compound being poured in hot and completely filling all the available space. Said compound serves not only as an effective insulating medium but also maintains the spaced relation of said clamping members. The two upper openings are thereupon sealed by plugs 33 and solder 34.

With the construction shown, it is practically impossible for expansion and contraction to result in the drawing in of moisture, which would be absorbed by the wrapping around the conductors. The natural tendency of moisture to flow downwardly along the conductors is a further factor in the attainment of the desired result as all the cables enter or leave through the bottom of the housing and not through the top thereof, the latter being completely closed. Furthermore, any partial vacuum in the housing is substantially prevented by having it filled with insulating compound and even if a slight suction developed at the joints below the base, tending to draw moisture upwardly along the cables into the container, said moisture could not cause injury until the liquid had risen in the container above the level of the upper end of the lead sheath, assuming that there was no filling compound in said container. Since all the available space is completely filled by such compound, no water can collect therein and the various parts embedded in said compound are held in fixed relation to each other.

The exposed conductors 25, 25' being arranged side by side with all of them projecting upwardly well above the base 10, they are in a very convenient position to permit their effective union by means of the clamp 26.

Since the exit cables, in the arrangement described, are grounded through the base to the entrance cable which has a lead sheath, the risk to linemen working on the pole is substantially eliminated.

The joints once having been made and the container closed, said joints are practically permanent, although if it should become necessary to gain access to the clamps or cable ends, the casing may be loosened from the filling compound by rapping it and then removing it, after softening the compound and the soldered joint 31.

In the modified construction shown in Fig. 4, the openings in the base are somewhat differently arranged, with the larger opening 35 in the center and a plurality of smaller openings 36 circumferentially arranged about the same and preferably spaced equidistant from each other. Each of these openings is surrounded by a flange 37 as in the first form described.

In making the connections with this type of device, the main cable enters through the central opening and the four conductors are deflected somewhat radially and united with the smaller cables in the manner previously described. While the clamps and the conductors leading thereto may be taped in this case also, the concentric arrangement lends itself readily to the use of a fibre insulator in the form of a cylinder 38 shown in Fig. 5 by the use of which much of the taping may be dispensed with. This fibre cylinder is slipped down over the conductors, being large enough to enclose all of them, after which a plurality of insulating spacers 39 are slipped down inside the cylinder 38 to separate the clamps from each other as shown. These insulating spacers are shorter than the cylindrical spacer, being slipped down until they make contact with the inclined conductors, their tops being preferably flush with the top of the cylindrical spacer.

I claim:

1. A joint for a multi-conductor high voltage cable, comprising a base having openings therein, a casing closed at its upper end and having its lower end engaging said base, a metal sheathed cable passing up through one of said openings and having its metal sheath integrally united to said base, and additional cables, with non-metallic sheaths, passing up through the remaining openings in said base, each cable having a metal reinforcement beneath said non-metallic sheath, exposed within said casing and integrally united to said base, whereby said additional cables are grounded through said base and said metal sheath, the conductors of said additional cables and of said other cable extending beyond the insulation thereof in an upwardly direction in contact with each other in groups, a clamp surrounding the ends of each group, and means for holding said clamps in spaced relation.

2. A cable joint housing, comprising a circular base having a large opening at one side thereof and a series of smaller openings spaced substantially equidistant from each other and from said first opening along the arc of a circle, each of said openings being surrounded by a flange, a flange on said base having a seat thereon, a cylindrical casing fitting said seat to form a tight joint therewith, a top for said casing having an opening therein surrounded by a flange, and a screw-threaded plug closing said opening.

3. A cable joint comprising a base plate having an opening for a metal sheathed cable and a series of smaller openings, a depending flange around the first mentioned and larger opening with which the sheath of said cable is integrally united, additional cables passing upwardly through said smaller openings with non-metallic coverings which terminate below said base, flexible metallic reinforcements normally beneath said coverings but exposed within said housing and integrally united to said base, the conductors of said first cable and said additional cables extending upwardly in contact with each other in groups, means for holding the conductors of each group in close mechanical and electrical contact, and insulating material separating each of said groups from the other and from the wall of said housing.

4. A joint for a multi-conductor high voltage cable, comprising a base having openings therein, a casing closed at its upper end and having its lower end resting on said base, a metal sheathed cable passing up through one of said openings and having its metal sheath integrally united to said base, and additional cables with non-metallic sheaths passing up through the remaining openings in said base, each having a metal reinforcement beneath said non-metallic sheath, exposed within said casing and integrally united to said base, whereby said additional cables are grounded through said base and said metal sheath, the conductors of said additional cables and the conductors of said metal sheathed cable extending upwardly in exposed relation and clamped together in groups near the top of said casing, and insulating spacing members adapted to be slipped down over said groups when said casing is removed, to insulate said groups of conductors from each other.

5. In a cable joint structure, a horizontal base having openings therein, a casing fitting said base and removable upwardly, cables passing upwardly through said openings in parallel relation, certain of said cables being deflected laterally within said casing to permit the conductors thereof to engage other conductors in groups in the upper part of said casing, means for confining the conductors of each group, and insulating partitions surrounding each group and applicable thereto from above the same, said partitions being supported by said laterally deflected portions of said cables.

CLOYCE A. JAQUES.